Nov. 3, 1953

L. O. McMAHON 2,657,914

PRESSURE RIPPER

Filed Jan. 15, 1951

INVENTOR.
LEWIS O. McMAHON
BY
Charles R. Wormer
ATTORNEY

INVENTOR.
LEWIS O. McMAHON
BY
Charles R Werner
ATTORNEY

Nov. 3, 1953      L. O. McMAHON      2,657,914
PRESSURE RIPPER

Filed Jan. 15, 1951      3 Sheets-Sheet 3

INVENTOR.
LEWIS O. McMAHON
BY
Charles R. Werner
ATTORNEY

Patented Nov. 3, 1953

2,657,914

UNITED STATES PATENT OFFICE 2,657,914

PRESSURE RIPPER

Lewis O. McMahon, Loveland, Colo.

Application January 15, 1951, Serial No. 206,112

1 Claim. (Cl. 262—8)

This invention relates in general to ground working devices and in particular to a pressure ripper for attachment to and operation by a tractor, bulldozer or the like.

A number of structures have been devised which attach to or are drawn by a tractor and are adapted for operation by the operator of the tractor. However, the objects of my invention are, first, to provide a pressure ripper designed as an auxiliary device and which may be firmly secured to the rear end of a tractor without modification of the tractor or any special drilling or welding.

Second, to provide a pressure ripper which after easy attachment to the tractor may be connected to a cable control already on the tractor or available as special equipment therefor.

Third, to provide a pressure ripper securable to the rear end of a tractor as a permanent fixture and not as a trailer or drawn device which would hinder free movement of the tractor.

Fourth, to provide a permanently fixed yet easily detachable pressure ripper, the ripper teeth of which will be movable into and out of operating position at will by the tractor operator.

Fifth, to provide a pressure ripper mountable on a tractor and which, when moved out of ripping position, will not interfere with other operations performed by the tractor.

Sixth, to provide a pressure ripper which will have considerable ripping force and yet be yieldable to avoid damage to the ripper teeth upon contact with an unyielding object.

Seventh, to provide a pressure ripper adjustable to any degree of ripping relation to the ground.

Other objects and advantages as well as the construction and operation of my invention will be apparent by reference to the following description in connection with the accompanying drawings in which.

Figure 1:
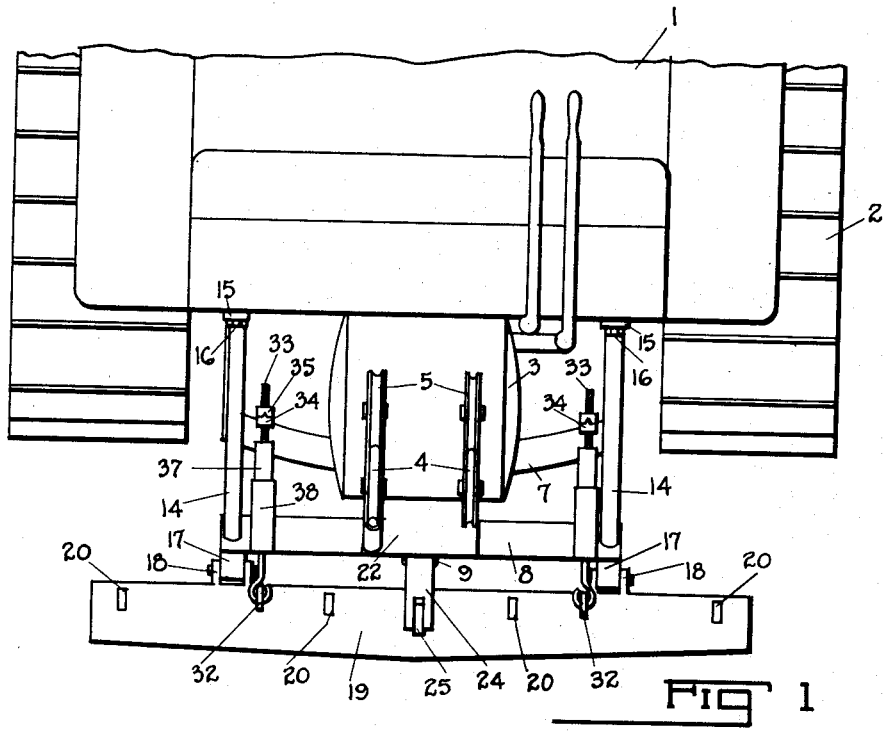
Fig. 1 is a top plan view of my pressure ripper, a fragmentary portion of a tractor being shown.
Figure 2:
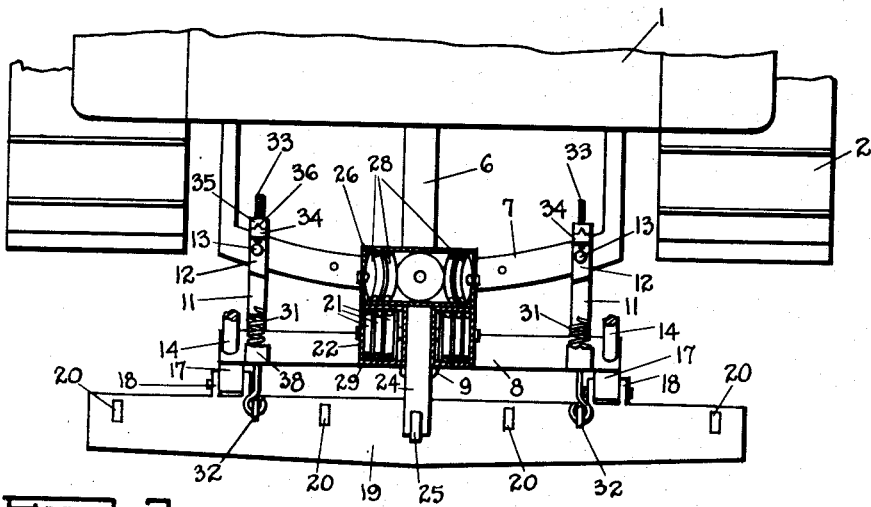
Fig. 2 is a similar view with certain portions of the tractor eliminated and parts of the pressure ripper assembly being broken away to better illustrate certain other parts.
Figure 3:
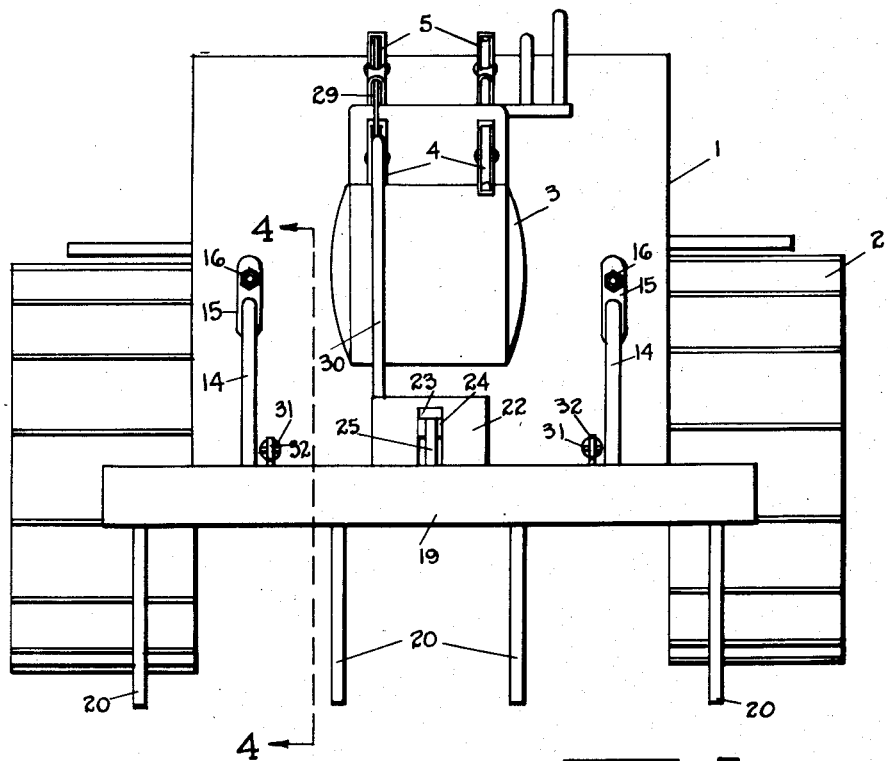
Fig. 3 is a rear elevational view of my pressure ripper assembled on a tractor.

Referring now to the drawings by numerals of reference 1 designates the tractor with treads 2, cable control 3 with sheaves 4 and 5, and drawbar 6 with arcuate guide bar 7, the structure thus far described being standard parts on the tractor.

My invention comprises a short transverse bar 8 suitably secured in bifurcated end 9 of drawbar 6 by pin 10. At each end of the transverse bar 8 I have provided a rigid projecting brace 11, the bifurcated end 12 of which is adapted to secure to guide bar 7 by suitable fastening members 13 carried in openings in the bifurcated ends 12 and openings already provided in the guide bar 7. Additional angular braces 14 are permanently secured to the transverse bar 8 adjacent the ends thereof and may be removably secured at flanges 15 by suitable fastening members 16 adapted to fit in threaded openings already existent in the tractor.

At each end of the transverse bar 8 is a rearwardly projecting lug 17 rockably secured to ears 18 on ripper bar 19. A plurality of ripper teeth 20 may be suitably carried on said ripper bar.

The ripper bar operating means includes a plurality of sheaves 21 carried in sheave housing 22 which is securely mounted to transverse bar 8. A central passage 23 in sheave housing 22 guides slidable guide bar 24, one end of which is pivotally secured to lug 25 on the ripper bar, the other end of the guide bar being rigidly secured to a second sheave box or housing 26 carrying sheaves 28, said sheave housing 26 being freely movable with respect to sheave housing 22, a cable 29 being threaded on all the sheaves 21 and 28 and extending upwardly through cable guide 30 to sheave 4 which is a part of the cable control 3 normally obtainable with the tractor, action of the cable being controlled by the cable control which may be adapted to wind up, hold by braking action, or release the cable. Usually, clutch means are included in the cable control to prevent rupture of the cable by overloads.

Adapted to normally urge the ripper bar 19 with ripper teeth 20 into raised or out of ground contacting position are tension springs 31, one end of which engages hook 32 on the ripper bar 19, the other end of each spring carrying threaded portion 33 passing through flange 34 on bifurcated end 12 of brace 11, a suitable notched nut 35 threadedly engaging portion 33 and prevented from accidental rotation by notch engaging projection 36 on the flange 34. Spring sleeves 37 and 38 telescopically engaging each other may be provided to keep the springs free from foreign matter and debris.

Figure 4:
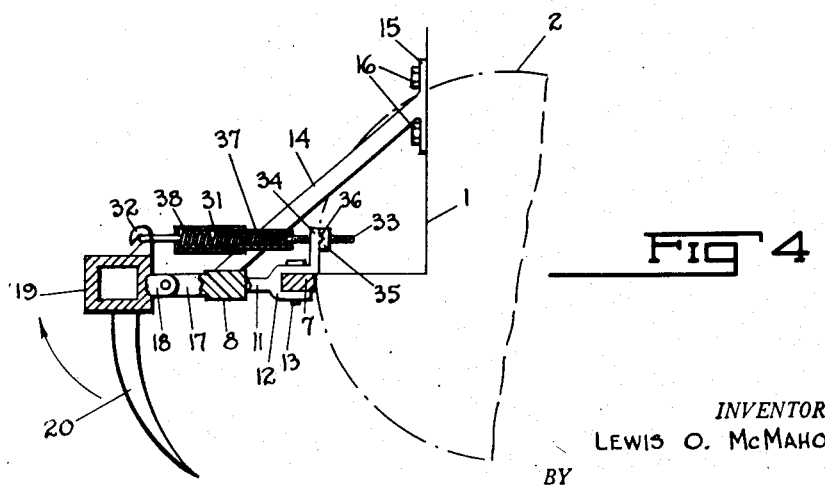
Fig. 4 is a vertical sectional view on the line 4—4 of Fig. 3.
Figure 5:
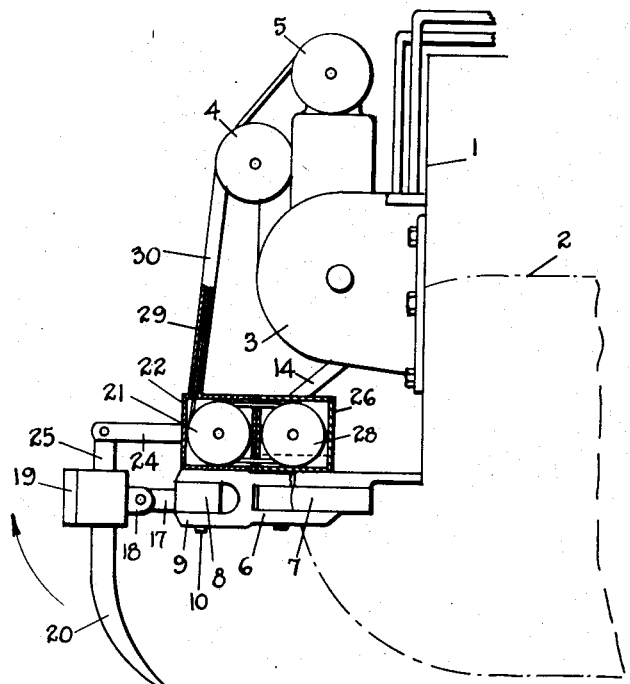
Fig. 5 is a side elevational view of my invention, showing the cable control and a fragmentary portion of the tractor, certain parts being shown in section for clarity of illustration, the ripper teeth being shown in ground engaging position.
Figure 6:
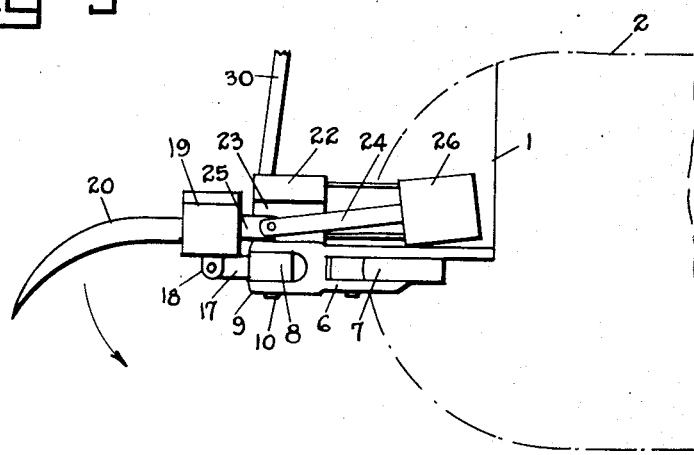
Fig. 6 is a similar view of the device with the ripper teeth in retracted position, the view being partly in section through the sheave housings.

In operation, the ripper teeth 20 are normally urged into the position shown in Fig. 6, that is, disengaged from the ground, by the action of the springs 31, the tension thereof urging sheave housing 26 away from sheave housing 22. When it is desired to force the ripper teeth into the ground the operator manipulates the cable control 3 to wind up the cable 29 on multiple sheaves 21 and 28, this action drawing sheave housing 26 toward sheave housing 22, the guide bar 24 rocking the ripper bar 19 so that ripper teeth 20 are swung downwardly and forwardly into the ground. (See Figs. 4 and 5.)

The pull of the cable elongates springs 31 increasing the tension thereof. Release of cable tension by the cable control will cause the springs to once again return the ripper bar and teeth to disengaged position. Abnormal loads on the ripper teeth will be taken up through the cable and clutch means in the cable control, the ripper teeth swinging backwards and riding over the obstruction causing the overload. The cable control can be manipulated to bring the ripper blades into any desired ripping relation with the ground for any desired angle or depth of cut.

It will be seen from the foregoing that I have provided a relatively simple yet effective pressure ripper, easily mountable on a tractor with no modifications necessary to the tractor and which will not interfere with the normal operation of said tractor.

Also, it will be seen that in my pressure ripper the cable is so arranged as to pull the ripper teeth down into the ground effecting positive operation of said ripper teeth in contrast to other devices in which the cable is used to pull the ripper teeth out of ground engaging position, the inherent and considerable weight of the ripper being depended on for ripping operations.

Obviously, changes in form, proportion and details of construction may be resorted to without departing from the spirit of my invention and I reserve all rights to such changes as come within the scope of these specifications and the claim which follow.

What I claim as new and desire to secure by Letters Patent is:

In a pressure ripper, a pivoted ripper bar, ripper teeth on the ripper bar, a pair of sheave units, one sheave unit being stationary, the other sheave unit being movably related to the stationary sheave unit, a connecting member between the ripper bar and the movable sheave unit, a cable operably connected to the sheave units, a power source for the cable, and spring means normally urging the ripper teeth out of ground engaging position, operation of said cable drawing the movable sheave unit toward the stationary sheave unit and rocking the pivoted ripper bar to ripper teeth ground engaging position, the stationary sheave unit including a guide for the connecting member between the ripper bar and the movable sheave unit.

LEWIS O. McMAHON.

References Cited in the file of this patent

UNITED STATES PATENTS

| Number | Name | Date |
|---|---|---|
| 1,155,795 | Clay | Oct. 5, 1915 |
| 1,319,951 | Erter | Oct. 28, 1919 |
| 2,302,614 | Le Tourneau | Nov. 17, 1942 |
| 2,490,904 | Gustafson | Dec. 13, 1949 |